(12) United States Patent
Xu et al.

(10) Patent No.: US 8,240,973 B2
(45) Date of Patent: Aug. 14, 2012

(54) PALLETIZING ROBOT

(75) Inventors: Xiao-Ming Xu, Shenzhen (CN); Hua Li, Shenzhen (CN); Xi-Song Shuai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 467 days.

(21) Appl. No.: 12/492,412

(22) Filed: Jun. 26, 2009

(65) Prior Publication Data

US 2010/0272552 A1     Oct. 28, 2010

(30) Foreign Application Priority Data

Apr. 25, 2009   (CN) ...................... 2009 1 0301845

(51) Int. Cl.
*B25J 9/04* (2006.01)
*B65B 35/50* (2006.01)
*B66B 5/00* (2006.01)
*B65G 61/00* (2006.01)
*B65G 47/04* (2006.01)

(52) U.S. Cl. ................. 414/799; 414/792.9; 414/926; 414/744.3; 700/217; 901/48; 187/409

(58) Field of Classification Search .................. 187/238, 187/409; 414/744.1–744.8, 792.7, 792.9, 414/793, 793.1, 793.4, 799, 923–924, 926, 414/931; 700/217; 901/48

See application file for complete search history.

(56) References Cited

U.S. PATENT DOCUMENTS

| | | | | |
|---|---|---|---|---|
| 2,956,696 A | * | 10/1960 | Drakengren | 414/791.8 |
| 3,257,005 A | * | 6/1966 | Annnable et al. | 414/792.2 |
| 3,665,148 A | * | 5/1972 | Yasenchak et al. | 219/124.4 |
| 3,710,532 A | * | 1/1973 | Smilek et al. | 414/789.5 |
| 4,242,025 A | * | 12/1980 | Thibault | 414/792 |
| 4,502,830 A | * | 3/1985 | Inaba et al. | 414/735 |
| 4,588,346 A | * | 5/1986 | Smith | 414/673 |
| 4,597,707 A | * | 7/1986 | Cornacchia | 414/792 |
| 4,616,782 A | * | 10/1986 | Marietta et al. | 239/752 |
| 4,978,274 A | * | 12/1990 | de Groot | 414/744.3 |
| 5,069,598 A | * | 12/1991 | Kleinhen et al. | 414/790 |
| 5,249,917 A | * | 10/1993 | Neumann et al. | 414/799 |
| 5,450,766 A | * | 9/1995 | Holt | 73/866.5 |
| 5,606,262 A | * | 2/1997 | Montalbano et al. | 324/758 |
| 5,773,771 A | * | 6/1998 | Chatham | 187/282 |
| 6,888,343 B1 | * | 5/2005 | Holt et al. | 324/750.22 |
| 2005/0196263 A1 | * | 9/2005 | Tamura | 414/744.5 |

FOREIGN PATENT DOCUMENTS

JP   01220641 A  *  9/1989
JP   11199052 A  *  7/1999

* cited by examiner

*Primary Examiner* — Gregory Adams
(74) *Attorney, Agent, or Firm* — Altis Law Group, Inc.

(57) ABSTRACT

A palletizing robot includes at least one rotatable pallet; a crane comprising a rotary base, a lifting frame fixed on the rotary base, and an extensible mechanical hand slidably engaged to the lifting frame to grasp a good; and a controller. The controller controls the crane and the at least one rotatable pallet to cooperatively stack the goods on the rotatable pallet, and control the at least one rotatable pallet to rotate itself to package the stacked goods.

5 Claims, 2 Drawing Sheets

PALLETIZING ROBOT

BACKGROUND

1. Technical Field

The present disclosure relates to a robot, and particularly, to a palletizing robot.

2. Description of the Related Art

Industrial robots are widely used in various applications to greatly reduce the burden of factory workers. An industrial robot, such as a palletizing robot, is used to stack goods for transport or storage. However, the stacked goods need to be packaged with a protective plastic film by an extra packaging device. The need for the extra packaging device and additional manual labor to package the stacked goods, becomes costly. In addition, arranging and packaging the goods are not completely automatic.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
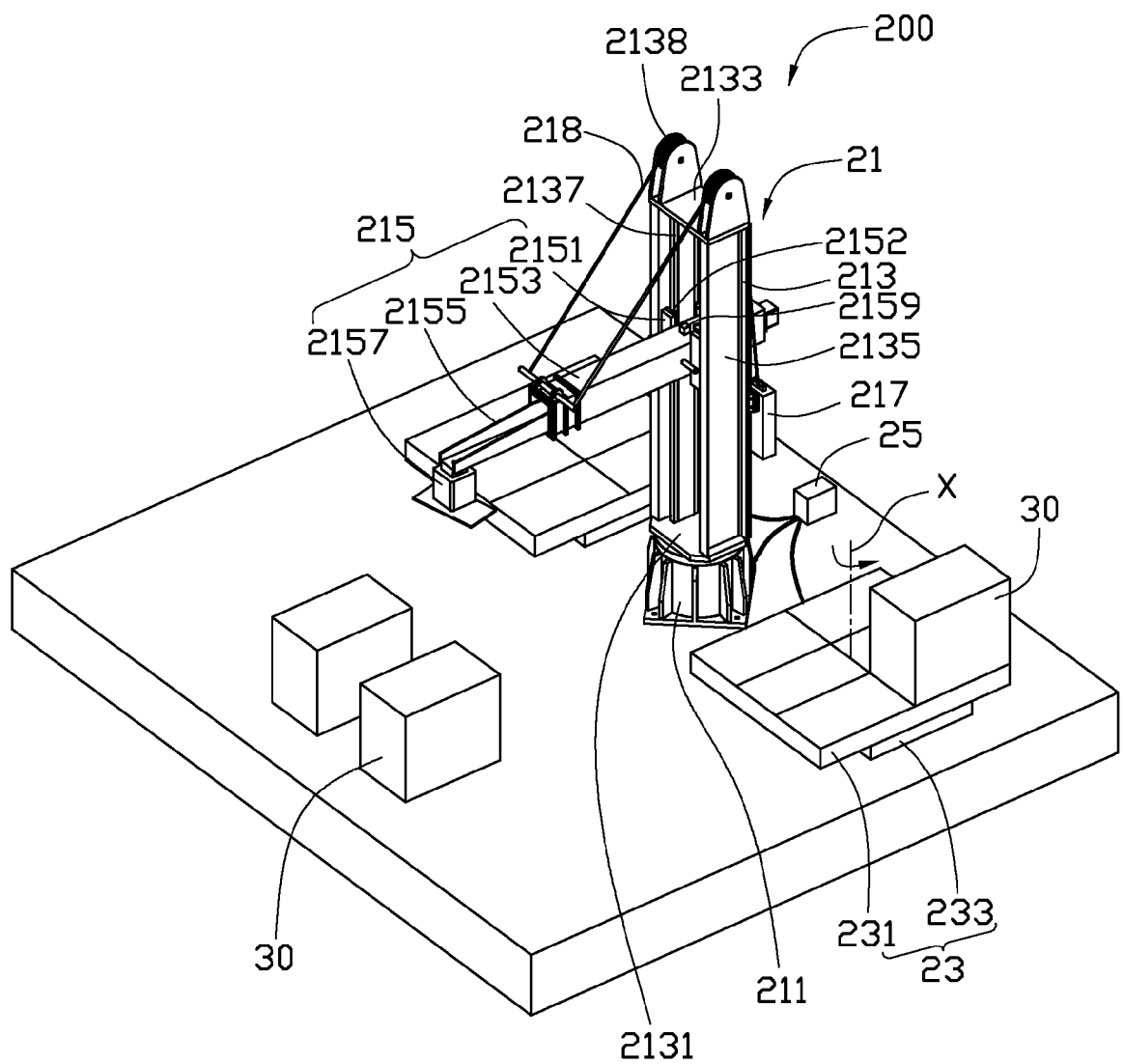
FIG. 1 is an isometric view of an embodiment of a palletizing robot.

Referring to FIG. 1, an embodiment of a palletizing robot 200 includes a crane 21, a rotatable pallet 23, and a controller 25. The controller 25 controls the crane 21 and the rotatable pallet 23 to cooperatively stack goods 30, such as load, cargo, or an item, on the rotatable pallet 23. The controller 25 controls the rotatable pallet 23 to rotate itself to package the stacked goods 30.

The crane 21 includes a rotary base 211, a lifting frame 213, and an extensible mechanical hand 215. The rotary base 211 may be substantially columnar in shape. The lifting frame 213 includes a base plate 2131, a top plate 2133, and two lifting plates 2135 interconnecting with the base plate 2131 and the top plate 2133. The base plate 2131 of the lifting frame 213 is rotatably fixed on an upper surface of the rotary base 211. The two lifting plates 2135 are disposed apart, and are opposite to each other. Each of the two lifting plates 2135 defines a pair of sliding guides 2137 at an inner surface facing each other.

The extensible mechanical hand 215 includes a pair of sliding blocks 2151, a fixing portion 2153, an extension portion 2155, a holding member 2157, and a lift 2159. The fixing portion 2153 may be an elongated hollow rod. The fixing portion 2153 is slidably engaged to the lifting frame 213 via the pair of sliding blocks 2151 and the fixing portion 2153 is located between the two lifting plates 2135. The pair of the sliding blocks 2151 is fixed to two opposite surfaces at one end of the fixing portion 2153. Each sliding block 2151 defines a pair of sliding grooves 2152 engaged with a corresponding pair of sliding guides 2137 of the two lifting plates 2135. An end of the extension portion 2155 movably sleeves in a distal end of the fixing portion 2153, such that the extension portion 2155 can extend out from the distal end of the fixing portion 2153. The holding member 2157 is fixed to the other end of the extension portion 2155 away from the fixing portion 2153.

The holding member 2157 is used to grasp or hold goods 30. The lift 2159 is disposed on the fixing portion 2153 to drive the pair of sliding blocks 2151 to slide relative to the lifting frame 213, and also control a sliding direction of the sliding blocks 2151 with the fixing portion 2153. Thus, the holding member 2157 can be controlled to move to any position in a three dimensional space depending on the rotation of the rotary base 211, the sliding position of the extensible mechanical hand 215, and the extension of the extension portion 2155 of the extensible mechanical hand 215.

The crane 21 further includes a pair of fixed pulleys 2138 on a top of the top plate 2133, and a pair of counterbalance weights 217. Each fixed pulley 2138 is mounted on a side of the top plate 2133 and corresponding to a lifting plate 2135. The counterbalance weights 217 are located at a side of the lifting frame 213 away from the extension portion 2155. The two counterbalance weights 217 are connected to the distal end of the fixing portion 2153 by two ropes 218 via the corresponding fixed pulley 2138 to balance the goods 30 held by the holding member 2157.

Each rotatable pallet 23 includes a platform 231, and a motor 233 disposed under the platform 231. In this embodiment the platform 231 is rectangular. The controller 25 controls the motor 233 to drive the platform 231 to rotate perpendicular to the platform 231.

In this embodiment, the platform 231 is labeled to show six rectangular sections to arrange the goods 30 in an order according to a size of the goods 30.

Figure 2:
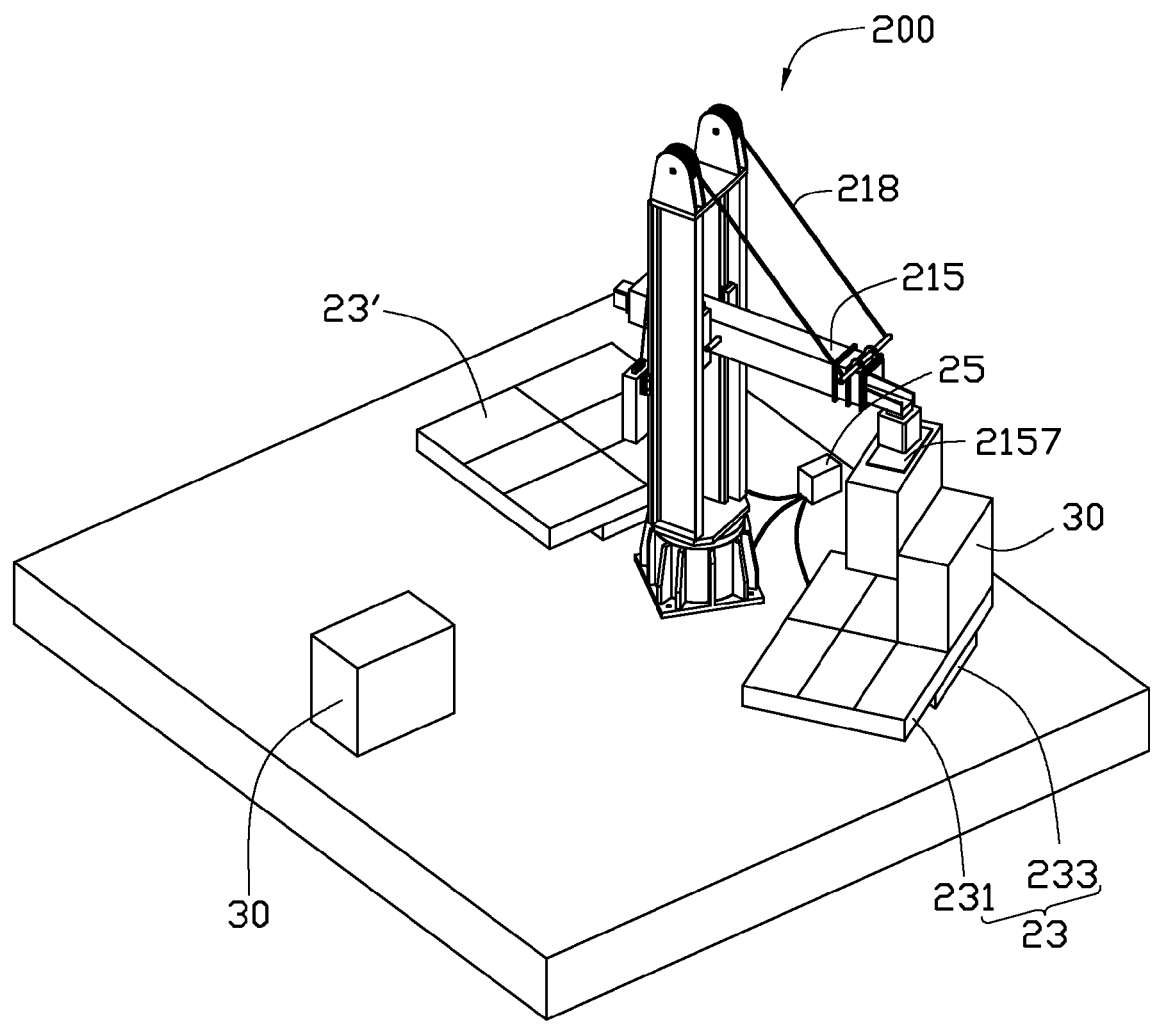
FIG. 2 is similar to FIG. 1, but showing a work state of the palletizing robot.

Referring also to FIG. 2, in use, the controller 25 controls the crane 21 to pickup one of the goods 30. The rotary base 211 of the crane 21 is rotated to position the lifting frame 213 to face the goods 30, and the extensible mechanical hand 215 is controlled to extend out the extension portion 2155 and place the holding member 2157 above one of the goods 30. The extensible mechanical hand 215 is controlled by the lift 2159 to slide downward along the lifting frame 213 until the holding member 2157 grasps one of the goods 30. The controller 25 then controls the crane 21 with the good 30 to move to a position above and adjacent to the rotatable pallet 23. Simultaneously, the controller 25 controls the rotatable pallet 23 to move or rotate to a position such that one of the six sections of the platform 231 is precisely below the good 30. The controller 25 controls the crane 21 to transfer the good 30 onto the rotatable pallet 23. The process to stack the rest of the goods 30 on the rotatable pallet 23 is repeated according to a predetermined configuration. Finally, the controller 25 controls the rotatable pallet 23 to rotate around a protecting plastic film or a protecting paper (not shown), until the stacked goods 30 are packaged with the protecting plastic film. Thus, the palletizing robot 200 can arrange and package the goods 30 automatically.

It should be pointed out that the palletizing robot 200 may further include a second rotatable pallet 23' and more additional pallets as needed. The controller 25 may control the crane 21 and the rotatable pallets 23, 23' to cooperatively stack the goods 30 or package the goods 30. For example, one of the rotatable pallets 23 is controlled to receive the goods 30, and the other of the rotatable pallets 23' is controlled to rotate itself to package the goods 30.

It is to be understood that, in an alternative embodiment, the label of the sections of the rotatable pallet 23 can be omitted or changed.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A palletizing robot, comprising:

at least one rotatable pallet;

a crane comprising:

a rotary base;

a lifting frame fixed on the rotary base, the lifting frame comprising a base plate fixed on the rotary base, a top plate, and two lifting plates interconnecting with the base plate and the top plate; the two lifting plates disposed apart and opposite to each other; each of the two lifting plates defining a pair of sliding guides at an inner surface facing the other lifting plate; and an extensible mechanical hand slidably engaged to the lifting frame to grasp a good, the extensible mechanical hand comprising a fixing portion, a pair of sliding blocks fixed to two opposite surfaces at a proximal end of the fixing portion, an extension portion movably sleeved in a distal end of the fixing portion, a holding member fixed to an end of the extension portion away from the fixing portion, and a lift disposed on the fixing portion to drive the pair of sliding blocks to slide relative to the lifting frame; each sliding block defining a pair of sliding grooves engaged with a corresponding pair of sliding guides of the two lifting plate; and a controller controlling the crane and the at least one rotatable pallet to cooperatively stack the goods on the rotatable pallet, and controlling the at least one rotatable pallet to rotate itself to package the stacked goods thereon.

2. The palletizing robot of claim 1, wherein the at least one rotatable pallet comprises a platform and a motor disposed under the platform; the controller controls the motor to drive the platform to rotate.

3. The palletizing robot of claim 2, wherein the platform is labeled to show a plurality of sections to arrange the goods on the sections in order according to a size of the goods.

4. The palletizing robot of claim 1, wherein the crane further comprises a pair of fixed pulleys on a top of the top plate, and a pair of counterbalance weights located at a side of the lifting frame away from the extension portion; the two counterbalance weights are connected to the distal end of the fixing portion by two ropes via a corresponding fixed pulley.

5. The palletizing robot of claim 1, wherein the at least one rotatable pallet comprises two rotatable pallets; a first of the two rotatable pallets is controlled by the controller to receive the goods, and a second of the rotatable pallets is controlled by the controller to rotate itself to package the goods.

\* \* \* \* \*